US012665449B2

(12) United States Patent
Witt

(10) Patent No.: US 12,665,449 B2
(45) Date of Patent: Jun. 23, 2026

(54) STATOR CORE FOR AXIAL FLUX MACHINE IN H DESIGN

(71) Applicant: Schaeffler Technologies AG & Co. KG, Herzogenaurach (DE)

(72) Inventor: Holger Witt, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 212 days.

(21) Appl. No.: 18/267,170

(22) PCT Filed: Nov. 10, 2021

(86) PCT No.: PCT/DE2021/100896
§ 371 (c)(1),
(2) Date: Jun. 14, 2023

(87) PCT Pub. No.: WO2022/127971
PCT Pub. Date: Jun. 23, 2022

(65) Prior Publication Data
US 2024/0048007 A1 Feb. 8, 2024

(30) Foreign Application Priority Data
Dec. 16, 2020 (DE) .......................... 102020133676.4

(51) Int. Cl.
*H02K 21/24* (2006.01)
*H02K 1/02* (2006.01)
(Continued)

(52) U.S. Cl.
CPC .............. *H02K 1/165* (2013.01); *H02K 1/02* (2013.01); *H02K 1/148* (2013.01); *H02K 16/02* (2013.01); *H02K 2213/03* (2013.01)

(58) Field of Classification Search
CPC .... H02K 16/02; H02K 16/025; H02K 1/2798; H02K 2201/06; H02K 21/24; H02K 16/00
See application file for complete search history.

(56) References Cited

U.S. PATENT DOCUMENTS

| | | | |
|---|---|---|---|
| 4,187,441 A | 2/1980 | Oney | |
| 5,245,238 A * | 9/1993 | Lynch ..................... | H02K 21/24 310/116 |

(Continued)

FOREIGN PATENT DOCUMENTS

| | | |
|---|---|---|
| CN | 201509139 | 6/2010 |
| CN | 204721115 U | 10/2015 |

(Continued)

OTHER PUBLICATIONS

WO_2011107693_A2 translation (Year: 2011).*
WO9533596A1 (Year: 1995).*

*Primary Examiner* — Oluseye Iwarere
*Assistant Examiner* — Nicholas Lee Setzer
(74) *Attorney, Agent, or Firm* — Volpe Koenig

(57) ABSTRACT

A stator of an electric machine of axial flux design, with and a stator core, which forms a structural unit and includes a first region oriented towards a first axial outer side, and a second region oriented towards a second axial outer side. In the first region, stator teeth and winding grooves are formed on the first outer side alternately in the peripheral direction. In the second region, stator teeth) and winding grooves are formed on the second outer side alternately in the peripheral direction. The stator teeth of the first and second regions are oriented offset to each other. The winding grooves of the first and second regions are radially distanced from one another in the peripheral direction such that there is no overlap of the
(Continued)

winding grooves of the first and second regions in the axial direction in the outer surface that runs around radially.

19 Claims, 6 Drawing Sheets

(51) Int. Cl.
    *H02K 1/14*        (2006.01)
    *H02K 1/16*        (2006.01)
    *H02K 16/02*      (2006.01)

(56) References Cited

U.S. PATENT DOCUMENTS

| | | | | |
|---|---|---|---|---|
| 5,619,087 | A * | 4/1997 | Sakai | H02K 21/24 |
| | | | | 310/410 |
| 7,777,391 | B2 * | 8/2010 | Asano | H02K 21/24 |
| | | | | 310/268 |
| 7,888,839 | B2 * | 2/2011 | Gabrys | H02K 21/24 |
| | | | | 310/140 |
| 9,071,117 | B2 | 6/2015 | Woomer | |
| 2009/0015110 | A1 * | 1/2009 | Asano | H02K 21/24 |
| | | | | 29/596 |
| 2013/0154397 | A1 * | 6/2013 | Sullivan | H02K 21/22 |
| | | | | 310/68 B |
| 2014/0361653 | A1 | 12/2014 | Jansen et al. | |
| 2015/0048696 | A1 * | 2/2015 | Kobler | H02K 21/24 |
| | | | | 310/44 |
| 2020/0106351 | A1 * | 4/2020 | Sozer | H02K 21/24 |
| 2021/0143714 | A1 * | 5/2021 | Hattori | H02K 1/146 |
| 2021/0218322 | A1 * | 7/2021 | Mihaila | H02K 5/203 |
| 2023/0231455 | A1 * | 7/2023 | Raber | H02K 21/026 |
| | | | | 310/156.32 |

FOREIGN PATENT DOCUMENTS

| | | | | |
|---|---|---|---|---|
| CN | 109194082 | | 1/2019 | |
| CN | 109742916 A | | 5/2019 | |
| EP | 1538727 | | 6/2005 | |
| EP | 2606561 | | 10/2014 | |
| EP | 3485558 | | 12/2019 | |
| JP | 2001145311 A | | 5/2001 | |
| JP | 2009050044 | | 3/2009 | |
| JP | 5419478 B2 | | 2/2014 | |
| KR | 101070230 | | 9/2011 | |
| WO | 9533596 | | 12/1995 | |
| WO | WO-9533596 A1 * | 12/1995 | | H02K 15/026 |
| WO | WO-2011107693 A2 * | 9/2011 | | H02K 21/24 |

* cited by examiner

Fig. 1A
Fig. 1B
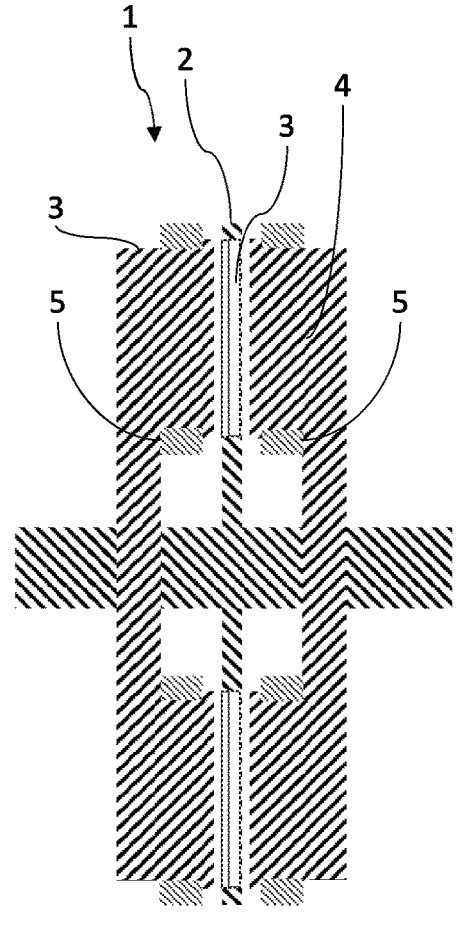
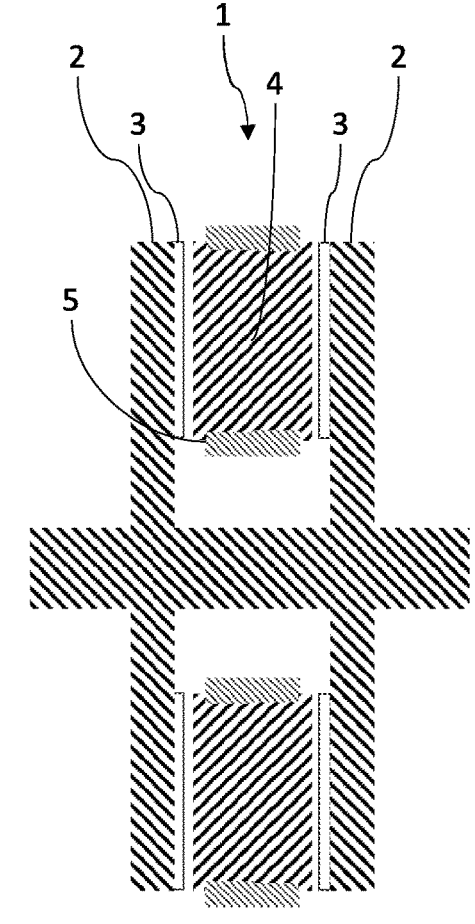
Prior Art
Prior Art

STATOR CORE FOR AXIAL FLUX MACHINE IN H DESIGN

CROSS-REFERENCE TO RELATED APPLICATIONS

This application is the U.S. National Phase of PCT Appln. No. PCT/DE2021/100896, filed Nov. 10, 2021, which claims priority from German Patent Application No. 10 2020 133 676.4, filed Dec. 16, 2020, the entire disclosures of which are incorporated by reference herein.

TECHNICAL FIELD

The present disclosure relates to a stator for an electric machine, an electric machine having a stator, and a vehicle having an electric machine. In particular, this is an axial flow machine in an H arrangement.

BACKGROUND

Due to constantly increasing demands on torque and power densities and further restrictions on installation space, the axial flow machine is becoming increasingly important, especially for applications in automobiles and in automation technology. Advantages of the axial flux machine over radial flux machines lie in their shortened axial length and their efficiency. A higher torque or power density is achieved with the same outer diameter.

A distinction is made between two types of axial flow machine:

In the so-called I arrangement (see FIG. 1A, a rotor is arranged between two stator halves. The publication CN 109194082 A, which shows an embodiment of such a machine, is given here as an example.

In the so-called H arrangement (see FIG. 1B), a stator is arranged between two rotor halves. The publication EP 2 606 561 B1, which shows an embodiment of such a machine, should be mentioned here as an example.

For alternative designs, refer to the literature. EP1538727, which discloses an axial flow machine with a stator and a rotor, should also be mentioned as an example.

For example, EP3485558 shows an axial flux machine in an H arrangement, wherein the electric machine is referred to as a yokeless machine. The windings are on the stator cores, which are clamped or cast/glued between cooling vanes, which in turn are connected to the outer housing. The cooling vanes are in particular part of the housing and realized as a laminated core.

US9071117BB shows an H arrangement axial flux machine in which the stator teeth are fixed by gluing them in discs with pockets. In particular, the discs form a closed housing through which a cooling medium can flow.

An axial flow machine in an H arrangement is also shown in KR101070230 B1. In particular, a stator core is shown here in which stator teeth are arranged opposite one another on both sides of a carrier disk, and individual windings are then applied to these teeth.

In particular, due to the structural conditions, the stator is often subject to conflicting requirements: On the one hand, high mechanical stability and the guarantee of electromagnetic properties are required; on the other hand there is a reduction in the axial installation space and possibilities for cooling, which, due to the required volumes, are further inconsistent with optimal utilization of installation space.

SUMMARY

The object of the present disclosure is therefore to provide solutions for an optimized use of installation space while ensuring mechanical stability and electromagnetic properties, taking into account suitable cooling concepts.

The object is achieved by the use of one or more of the measures described herein the. Further advantageous embodiments are described below and in the claims.

According to one aspect, the stator of an axial-flux type electric machine includes a rotation axis and a stator core, which forms a structural unit. In this case, the stator core comprises a first region which is oriented towards a first axial outer side. This alternately forms stator teeth and winding grooves in the circumferential direction on the first axial outer side.

Further, the stator core comprises a second region oriented towards a second axial outer side. This alternately forms stator teeth and winding grooves in the circumferential direction on the second axial outer side.

The stator teeth of the first region are aligned offset to the stator teeth of the second region. The winding grooves of the first region are spaced apart from the winding grooves of the second region on an outer radially circumferential surface in the circumferential direction in such a way that the winding grooves of the first region do not overlap the winding grooves of the second region on the outer radially circumferential surface in the axial direction.

The components of the stator core are referred to as stator teeth, which are designed as circumferentially spaced, tooth-like axially outwardly directed projections of the stator body, and an air gap for the magnetic field is formed between the free ends thereof and a rotor.

In particular, the mechanical stability can be increased by this arrangement without increasing the axial length, since the spaced orientation of the winding grooves leaves sufficient material between a stator tooth of the first region and a diagonally adjacent stator tooth of the second region. This also has a positive effect on the electromagnetic properties of the stator core.

In an advantageous embodiment, the stator tooth of the first region and a winding groove of the second region are opposite one another in such a way that the overlap, measured in the circumferential direction on an outer radially circumferential surface as distance $d_U$, of the stator tooth of the first region to a first diagonally adjacent stator tooth of the second region deviates less than 10% from the overlap of the stator tooth of the first region to a second diagonally adjacent stator tooth of the second region.

According to one configuration, the stator comprises a first coil arrangement in the first region, wherein the first coil arrangement is contained in sections in the winding slots of the first region. The stator also comprises a second coil arrangement in the second region, wherein the second coil arrangement is contained in sections in the winding slots of the second region.

In particular, the use of the first coil arrangement and the second coil arrangement enables the stator to be assembled more easily.

According to a further configuration of the stator, the winding grooves of the first region are at a distance $d_U$ from the winding grooves of the second region on an outer, radially circumferential surface in the circumferential direction; the winding grooves of the first region face the winding grooves of the second region on the outer, radially circumferential surface are at a distance $d_A$ in the axial direction. Thus, $k = d_A/d_U$ defines a ratio, wherein $k<1.5$, preferably $k<0.5$, $k<0.25$, $k<0.1$, $k<0.05$.

A length $d_Q$ can be described by the distance $d_A$ and the distance $d_U$ according to $$to d_Q = \sqrt{d_U^2 + d_A^2}.$$

The length $d_Q$ is the upper edge of a surface curved in the radial direction, in the overlapping of a stator tooth of the first region with a first diagonally adjacent stator tooth of the second region.

Particularly in the case of narrow stator teeth, as required in the case of distributed windings, k should advantageously be selected to be less than 1.5 so that mechanical stability is guaranteed despite the small axial length of the stator core.

In the case of single-tooth windings in particular, k<0.5 can be selected due to wider stator teeth, particularly preferably k<0.25 with unequal spacing $d_U$ between stator teeth, without this being at the expense of the mechanical stability.

In a particularly advantageous embodiment, the distance $d_A$ is so small that the winding grooves have an almost identical winding base. Advantageously, k<0.1, particularly preferably k<0.05, is selected here to take manufacturing tolerances into account.

According to a further embodiment of the stator, the first coil arrangement is realized in the form of a distributed winding, and the second coil arrangement is also realized in the form of a distributed winding.

This configuration is advantageously realized by the stator core described above, since the narrower stator teeth that are necessary in the case of a distributed winding would be at the expense of mechanical stability in a conventional design.

According to one configuration of the stator, the stator teeth of the first region and the winding slots of the first region form a first pattern on the first axial outer side. This first pattern is n-fold rotationally symmetrical with respect to the rotation matter of the stator. Furthermore, the stator teeth of the second region and the winding slots of the second region form a second pattern on the second axial outer side. This second pattern is n-fold rotationally symmetrical with respect to the rotation matter.

In particular, the first pattern and the second pattern are congruent and the first pattern is rotated relative to the second pattern by an angle such that the stator teeth of the first region face the winding slots of the second region and that the winding slots of the first region face the stator teeth of the second region. Due to the n-fold rotational symmetry, any torque ripple is structurally reduced.

In this particularly advantageous embodiment, the overlap of the stator tooth of the first region to a first diagonally adjacent stator tooth of the second region, measured in the circumferential direction on an outer radially circumferential surface as distance $d_U$, deviates by less than 20% from the overlap of the stator tooth of the first region to a second diagonally adjacent stator tooth of the second region.

With a suitable configuration of the rotors, a uniformly distributed pattern can also be implemented as a further embodiment.

According to a further configuration of the stator, the stator core is realized as a wound component.

In particular, the stator teeth and the winding grooves of the first region and the stator teeth and the winding grooves of the second region are introduced before winding, for example by punching, or after winding, for example by milling or electric discharge wire machining.

According to a further embodiment of the stator, the stator core is realized from a soft-magnetic powder composite material.

The stator is preferably pressed and baked from iron-containing powder. The process pressing force for this increases with the dimensions of the workpiece to be pressed. In the case of larger stator cores, the process pressing forces can become uneconomically large so that the stator core is preferably constructed from individual segments, wherein the individual segments are pressed separately from one another.

According to a further configuration of the stator, the stator core comprises multiple segments.

In particular, multiple adjacent teeth each form a mechanically stiff component. Several of these components are then assembled to form a complete stator core, wherein these are held together, for example, by means of web components and connected to the housing. Such a configuration means that the stator core has greater rigidity compared to a structure having individual teeth. This is particularly advantageous in the case of stator teeth that become shorter in the circumferential direction, as is required with a distributed winding.

According to a further aspect, an electric machine comprises a stator according to the aspect described above and embodiments described above. The stator is arranged to be axially between a first rotor and a second rotor.

According to a further aspect, a vehicle comprises an electric machine according to the described aspect.

BRIEF DESCRIPTION OF THE DRAWINGS

The disclosure is explained in more detail below using the embodiment shown in the figures. In the figures:

FIGS. 1A and 1B show schematic representations of electric machines in an axial flow design in an I arrangement (1A) and in an H arrangement (1B) according to the prior art;

DETAILED DESCRIPTION

Figure 2A:
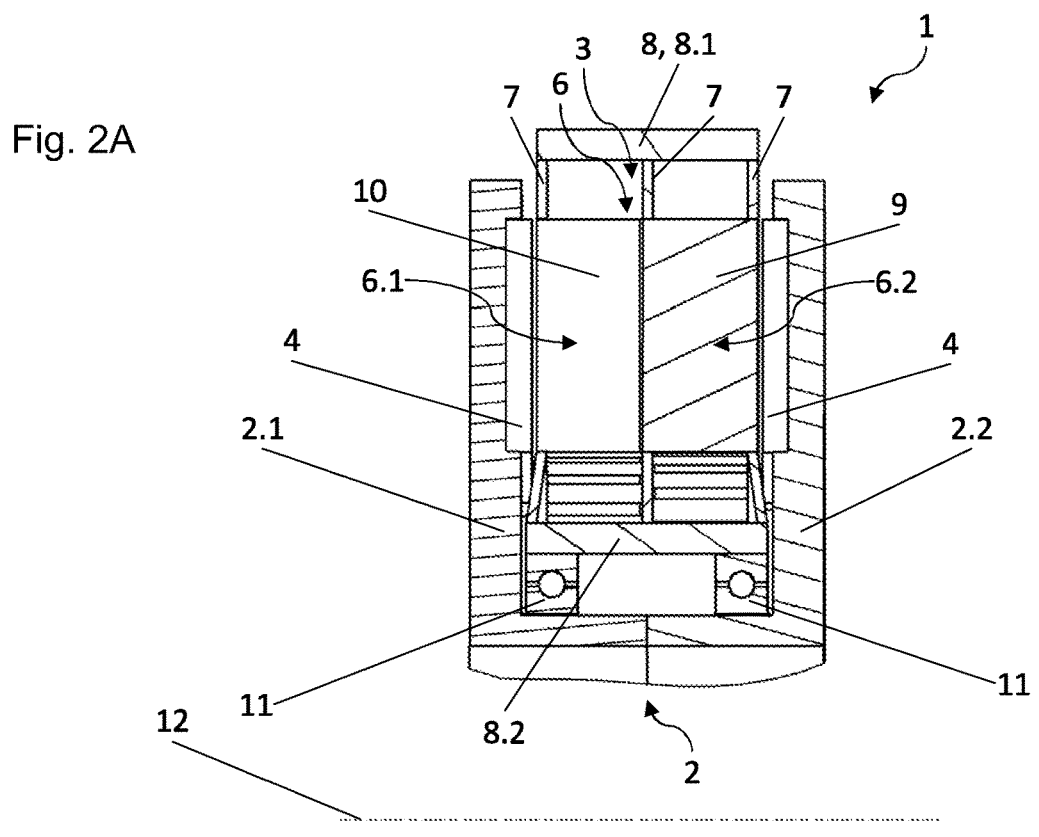
FIGS. 2A and 2B show sections through essential elements of an electric machine.

The following is a description of one embodiment according to the present disclosure.

FIGS. 1A and 1B show schematic representations of electric machines 1 in an axial flow design in an I arrangement 1a and in an H arrangement 1b according to the prior art. FIG. 1A shows the I arrangement of an electric machine in an axial flow design. Here, a rotor 2 is arranged to be axially between two halves of a stator 3. The rotor 2 with magnets 4 is operatively connected to the stator 3 comprising coil arrangements 5 via two air gaps.

FIG. 1B shows the H arrangement of an electric machine 1 in an axial flow design. Here, a stator 3 is arranged to be axially between two halves of a rotor 2. The rotor 2 with magnets 4 is operatively connected to the stator 3 comprising coil arrangements 5 via two air gaps.

Figure 2B:
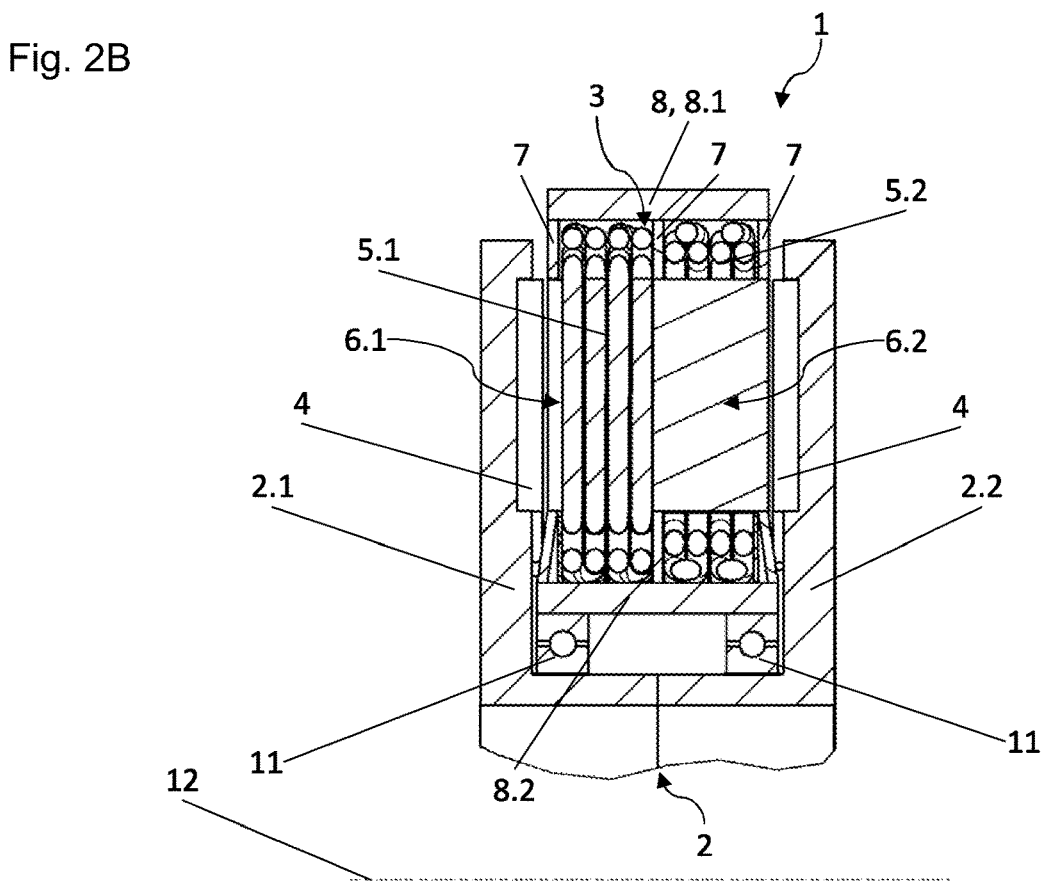

FIGS. 2A and 2B shows sections through essential elements of an electric machine 1. The embodiment of the electric machine 1 is an axial flow machine in an H arrangement. A rotor 2 is divided into a first rotor 2.1 and a second rotor 2.2. The stator 3 is arranged to be axially between the first rotor 2.1 and the second rotor 2.2. The stator 3 comprises a stator core 6, which is operatively connected to the housing 8 radially on the outside via multiple webs, wherein only a first outer housing element 8.1 is shown in the figure. A second inner housing element 8.2 is operatively connected to the stator core 6 radially on the inside via webs 7. The first rotor 2.1 is operatively connected via a bearing 11 to the second inner housing element 8.2, and the second rotor 2.2 is also operatively connected via a bearing 11 to the second inner housing element 8.2.

The first rotor 2.1 and the second rotor 2.2 support each other in the axial direction so that the typical axial flux machines in an H arrangement with magnets 4, in particular permanent magnets, on the first rotor 2.1, and the second rotor 2.2. acting magnetic forces of attraction in the direction of the stator 3 (axially, parallel to the rotation axis) are supported against each other.

It can be seen in FIG. 2A that the stator core 6 comprises a first region 6.1 towards a first axial outer side and a second region 6.2 towards a second axial outer side. The first region 6.1 forms stator teeth 9 and winding grooves 10 alternately in the circumferential direction on the first axial outer side towards the first rotor 2.1, the second region 6.2 forms stator teeth 9 and winding grooves 10 alternately in the circumferential direction on the second axial outer side towards the second rotor 2.2. In FIG. 2A, the sectional plane runs through a winding groove 10 in the first region 6.1 and through a stator tooth 9 in the second region 6.2. This is due to the fact that the stator teeth 9 and the winding grooves 10 of the first region 6.1 are arranged rotated about the rotation axis 12 relative to the stator teeth 9 and the winding grooves 10 of the second region 6.2, in other words are arranged offset in the circumferential direction.

FIG. 2B shows a first coil arrangement 5.1, which runs in sections in the winding groove 10 of the first region 6.1. The first coil arrangement 5.1 in particular is a distributed winding. A second coil arrangement 5.2 is also shown in the second region 6.2. It can be seen here that the first coil arrangement 5.1 is offset in the circumferential direction relative to the second coil arrangement 5.2.

Figure 3A:
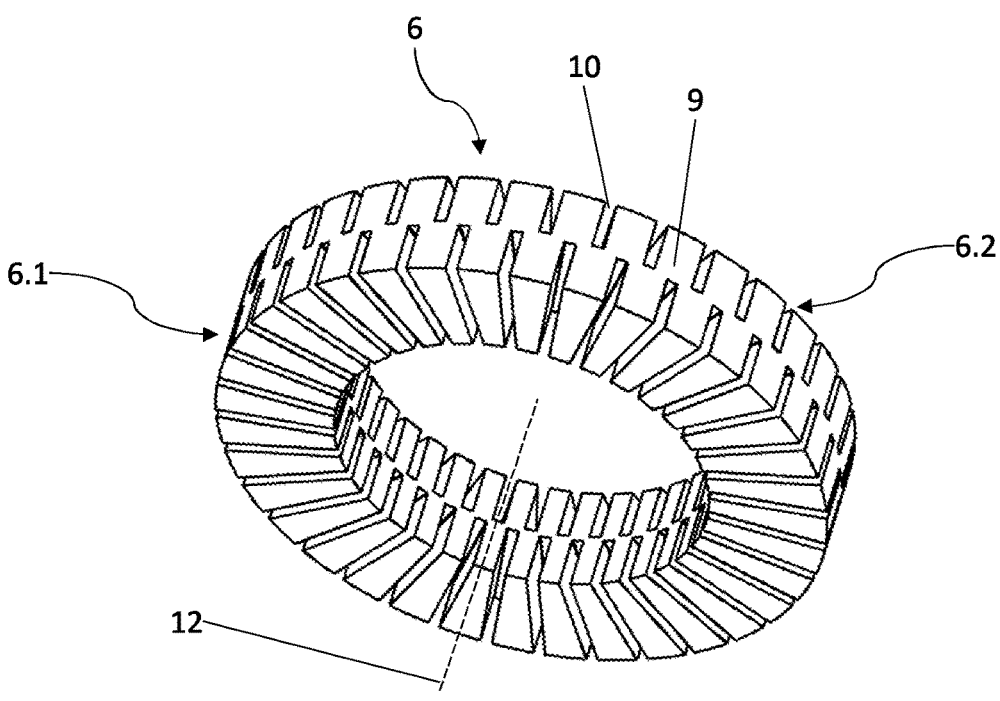
FIGS. 3A and 3B show a perspective illustration and a plan view of the stator core of the electric machine from FIGS. 2A and 2B.
Figure 3B:
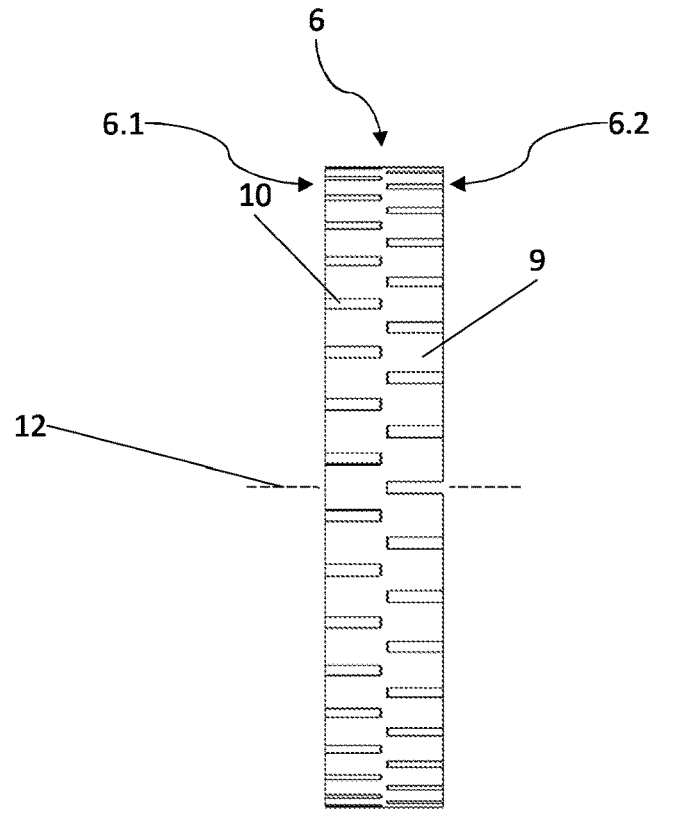

FIGS. 3A and 3B show a perspective view and a top view of the stator core 6 of the electric machine 1 from FIGS. 2A and 2B.

It can be seen in particular in FIG. 3A that the first region 6.1 is offset in the circumferential direction relative to the second region 6.2. In the embodiment shown here, the stator teeth 9 of the first region 6.1 are arranged opposite the winding grooves 10 of the second region 6.2. Furthermore, the stator teeth 9 and the winding slots are distributed uniformly in the first region 6.1 and in the second region 6.2. The embodiment of the stator core 6 shown is provided with its stator teeth 9 which are narrow in the circumferential direction and the winding slots 10 with a constant cross-section for a distributed winding.

In FIG. 3B it can be seen that despite the short axial overall length of the stator core 6, sufficient material remains as a supporting structure between a stator tooth 9 of the first region 6.1 and a diagonally adjacent stator tooth 9 of the second region 6.2. This also has a positive effect on the electromagnetic properties of the stator core 6.

Figures 4A, 4B:
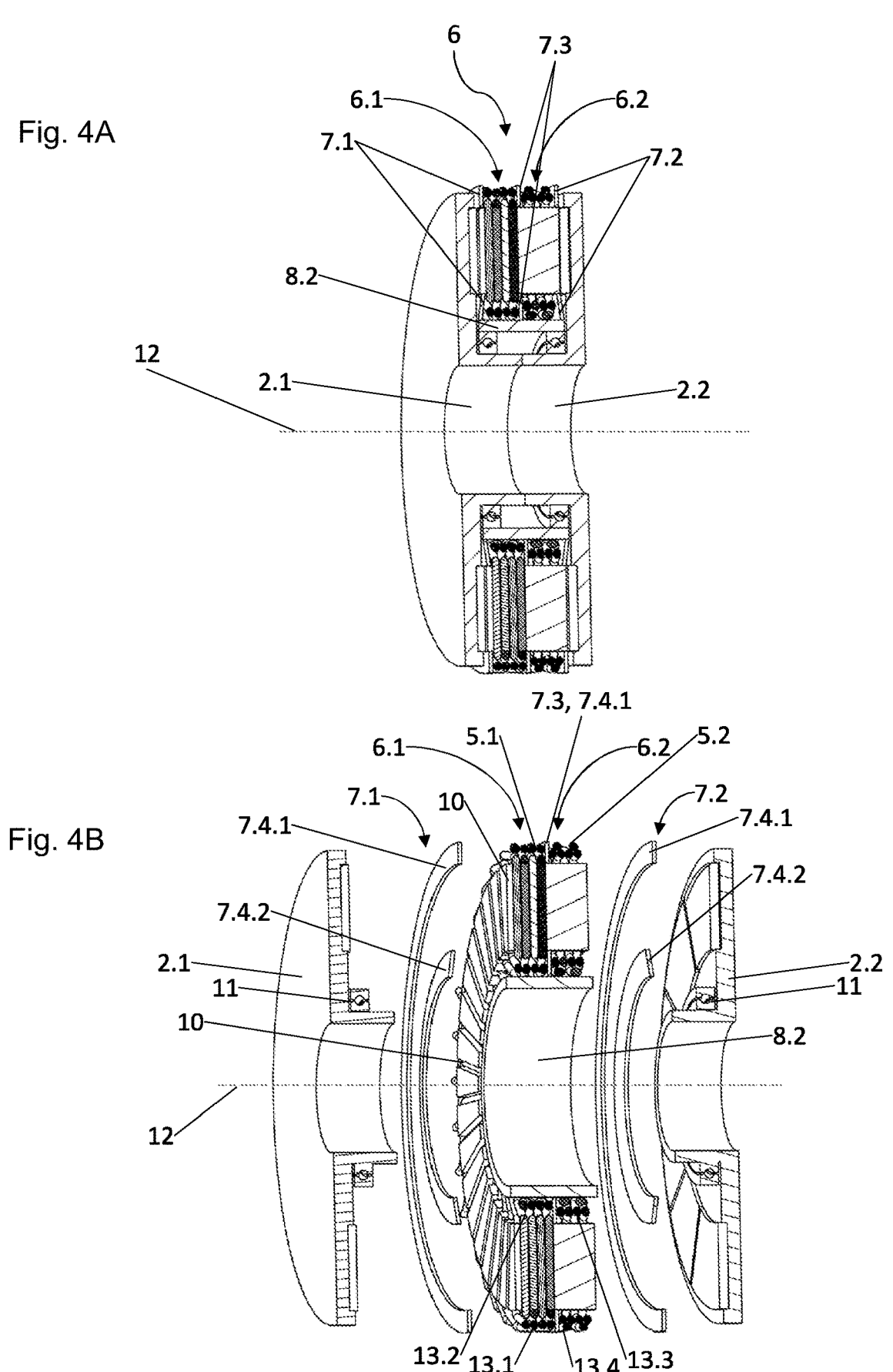
FIGS. 4A and 4B show a perspective partial section and an exploded section of the electric machine from FIGS. 2A and 2B.

FIGS. 4A and 4B show a perspective partial section (FIG. 4A) and an exploded section (FIG. 4B) of the electric machine from FIGS. 2A and 2B. For reasons of clarity, the first outer housing element 8.1 is not shown.

In addition to the function of fixing the stator core 6, the webs 7 form individual volumes with the first outer housing element 8.1 and the second inner housing element 8.2 for cooling the stator 3 using a suitable coolant.

A first outer web 7.1 is arranged in the first region 6.1 on the first axial outer side of the stator core 6. In the embodiment shown, the first outer web 7.1 consists of multiple web components 7.4 and comprises a first web component 7.4.1 in the form of a ring, which is arranged to be radially between the first housing element 8.1 and the radial outer side of the stator core 6, and a second web component 7.4.2 in the form of a ring, which is arranged to be radially between the second inner housing element 8.2 and the radial inner side of the stator core 6.

Furthermore, a second outer web 7.2 is arranged in the second region 6.2 on the second axial outer side of the stator core 6. In the embodiment shown, the second outer web 7.2 consists of multiple web components 7.4 and comprises a first web component 7.4.1 in the form of a ring, which is arranged to be radially between the first housing element 8.1 and the radial outer side of the stator core 6, and a second web component 7.4.2 in the form of a ring, which is arranged to be radially between the second inner housing element 8.2 and the radial inner side of the stator core 6.

An internal web 7.3 is arranged in the axial direction between the first region 6.1 and the second region 6.2. In the embodiment shown, the internal web 7.3 consists of multiple web components 7.4 and comprises a first web component 7.4.1 in the form of a ring, which is arranged to be radially between the first housing element 8.1 and the radial outer side of the stator core 6, and a second web component 7.4.2 in the form of a ring, which is arranged to be radially between the second inner housing element 8.2 and the radial inner side of the stator core 6.

Thus, in the embodiment shown, the electric machine 1 results in four volumes due to the arrangement of the first outer housing 8.1, the second inner housing 8.2, the first outer web 7.1, the second outer web 7.2, the internal web 7.3, and the rotor core.

A first outer volume 13.1 is formed in the first region 6.1 between the first housing element 8.1 and the radial outer side of the stator core 6 and between the first outer web 7.1 and the internal web 7.3. A first inner volume 13.2 is formed in the first region 6.1 between the radial inner side of the stator core 6 and the second inner housing element 8.2 and between the first outer web 7.1 and the internal web 7.3.

The first outer volume 13.2 is connected to the first inner volume 13.2 via the winding grooves 10 of the first region 6.1 in connection with the first coil arrangement 5.1. A sealing of the winding grooves 10 in the axial direction is not shown for reasons of clarity.

A second inner volume 13.3 is formed in the second region 5.2 between the radial inner side of the stator core 6 and the second inner housing element 8.2 and between the second outer web 7.2 and the internal web 7.3. The second web component 7.4.2 of the internal web 7.3 has openings 14 for connecting the first inner volume 13.2 to the second inner volume 13.3.

A second outer volume 13.4 is formed in the second region 5.2 between the first housing element 8.1 and the radial outer side of the stator core 6 and between the second outer web 7.2 and the internal web 7.3. The second inner volume 13.3 is connected to the second outer volume 13.4 via the winding grooves 10 of the second region 6.2 in connection with the second coil arrangement 5.2. A sealing of the winding grooves 10 in the axial direction is not shown for reasons of clarity.

Figure 5A:
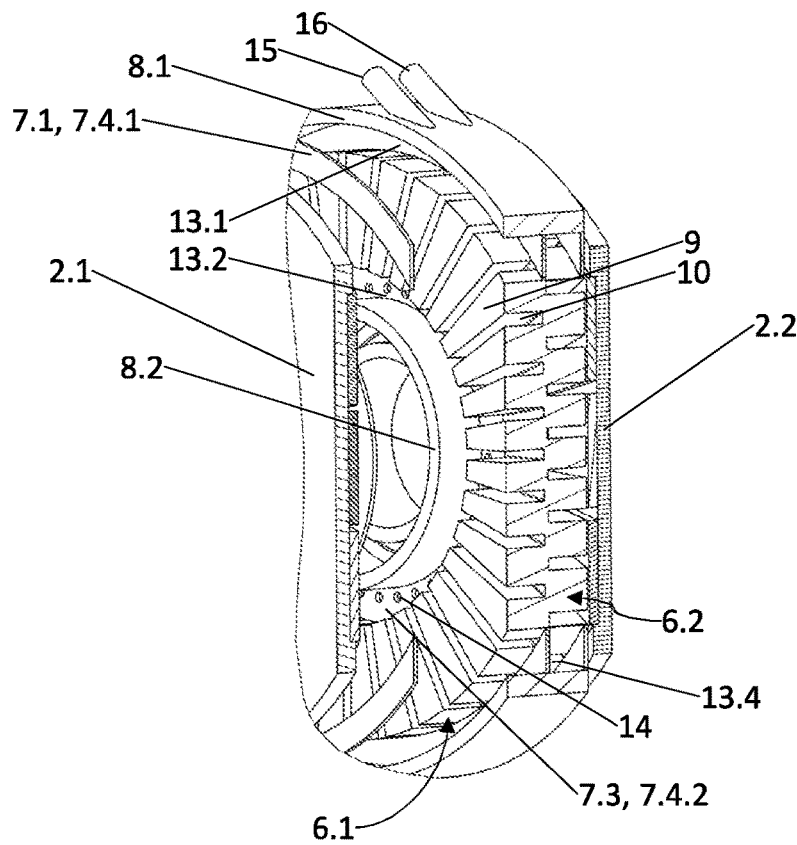
FIGS. 5A and 5B show a perspective partial section of essential components of the electric machine from FIG. 2 and a perspective detailed view.
Figure 5B:
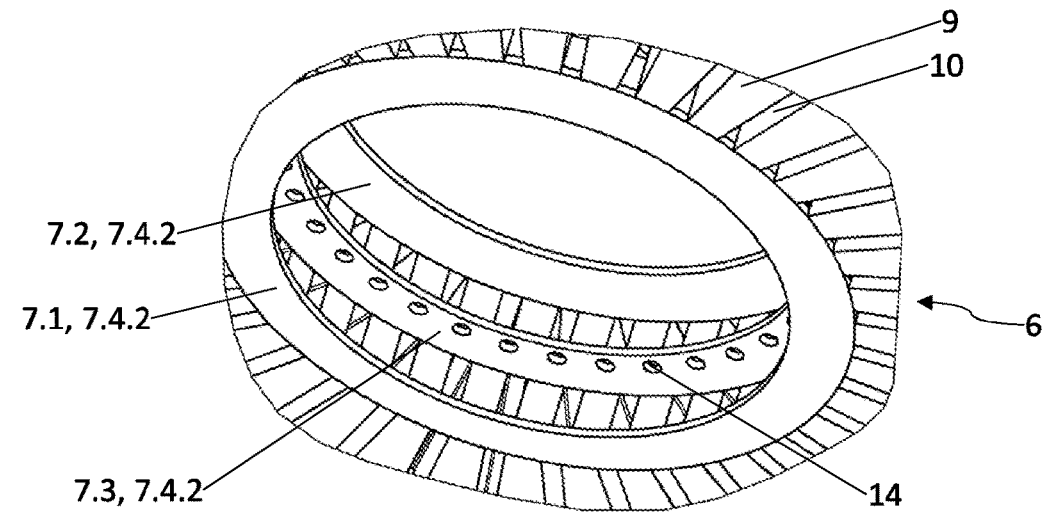

FIGS. 5A and 5B show a perspective partial section (FIG. 5A) of essential components of the electric machine 1 from FIGS. 2A and 2B and a perspective detailed view (FIG. 5B).

A feed line 15 is contained in the first outer housing element 8.1 for the feeding of suitable coolant into the first outer volume 13.1. To divert the appropriate coolant from the stator 3 and thus enable a coolant flow, a return line 16 is contained in the first outer housing element 8.1, which is connected to the second outer volume 13.4.

The feed line 15 is arranged with the first outer volume 13.1 in such a way that the suitable coolant is first distributed in the first outer volume 13.1 in the circumferential direction and thus thermally regulates the winding heads formed in the first outer volume 13.1, particularly in the case of a first coil arrangement 5.1 realized as a distributed winding.

Likewise, the suitable coolant is distributed in the circumferential direction in the first inner volume 13.2.

The internal web 7.3 has multiple openings 14 for connecting the first inner volume 13.2 to the second inner volume 13.3. In particular, the openings 14 are positioned in such a way that there is an even distribution in the circumferential direction in the first inner volume 13.2. As shown in FIGS. 5, 5b, the openings 14 are positioned radially on the inside such that the cooling medium flows as far as possible radially on the inside from the first inner volume 13.2 to the second inner volume 13.3 so that the best possible flow around the winding heads in the first inner volume 13.2 of the first coil arrangement designed as a distributed winding or the winding heads of the second coil arrangements 5.2 designed as a distributed winding and located in the second inner volume 13.3.

Figure 6:
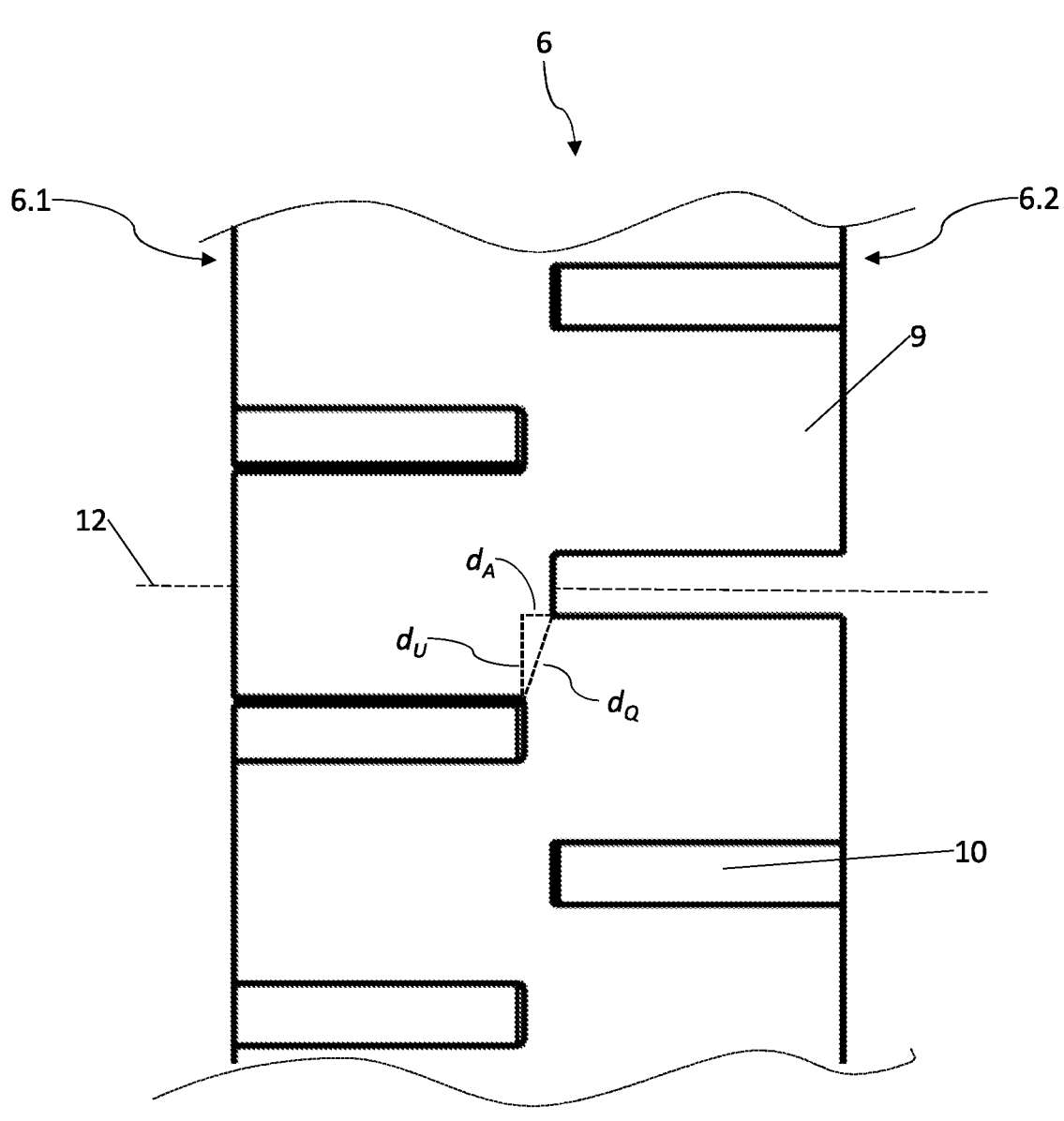
FIG. 6 shows a detailed plan view of the stator core of the electric machine from FIGS. 2A and 2B.

FIG. 6 shows a detailed plan view of the stator core of the electric machine from FIG. 2. The winding grooves 10 of the first region 6.1 are at a distance $d_U$ from the winding grooves 10 of the second region 6.2 on an outer radial circumferential surface in the circumferential direction; the winding grooves 10 of the first region 6.1 face the winding grooves 10 of the second region 6.2 on the outer radial circumferential surface in the axial direction at a distance $d_A$. Thus, $k=d_A/d_U$ defines a ratio, wherein $k<1.5$, preferably $k<k<0.25$, $k<0.1$, $k<0.05$.

Particularly in the case of narrow stator teeth 9, as required in the case of distributed windings, k should advantageously be chosen to be less than 1 so that mechanical stability is guaranteed despite the small axial overall length of the stator core 6. In the case of single-tooth windings, in particular, $k<0.5$, particularly preferably k<can be selected due to wider stator teeth 9, without this being at the expense of the mechanical stability.

LIST OF REFERENCE SYMBOLS

1 Electric machine
2 Rotor
2.1 First rotor
2.2. Second rotor
3 Stator
4 Magnet
5 Coil arrangement
5.1 First coil arrangement
5.2 Second coil arrangement
6 Stator core
6.1 First region

6.2 Second region
7 Web structure
7.1 First outer web
7.2 Second outer web
7.3 Internal web
7.4 Web component
7.4.1 First web component
7.4.2 Second web component
8 Housing
8.1 First outer housing element
8.2 Second inner housing element
9 Stator tooth
10 Winding groove
11 Bearing
12 Rotational axis
13.1 First outer volume
13.2 First inner volume
13.3 Second inner volume
13.4 Second outer volume
14 Openings
15 Feed line
16 Return line

The invention claimed is:

1. A stator of an electric machine having an axial flow design, the stator comprising:
   a rotation axis and a stator core forming a structural unit;
   a first region oriented towards a first axial outer side, and a second region oriented towards a second axial outer side;
   first stator teeth and first winding grooves formed alternately in the first region in a circumferential direction on the first outer side;
   second stator teeth and second winding grooves formed alternately in the second region in the circumferential direction on the second outer side;
   the first stator teeth are aligned to be offset to the second stator teeth; and
   the first winding grooves are spaced apart from the second winding grooves on an outer radially circumferential surface in the circumferential direction such that there is no overlap between the first winding grooves and the second winding grooves, from an axially innermost portion of the first and second winding grooves to an axially outermost portion of the first and second winding grooves, on the outer radially circumferential surface in an axial direction.

2. The stator according to claim 1, further comprising
   a first coil arrangement in the first region, the first coil arrangement is contained in sections in the first winding grooves; and
   a second coil arrangement in the second region, the second coil arrangement is contained in sections in the second winding grooves.

3. The stator according to claim 2, wherein
   the first winding grooves are at a distance $d_U$ to the second winding grooves on the outer radially circumferential surface in the circumferential direction, the first winding grooves are at a distance $d_A$ to the second winding grooves on the outer radially circumferential surface in the axial direction, and a ratio k of $d_A$ to $d_U$ is defined, wherein $k<1.5$.

4. The stator according to claim 3, wherein
   the first coil arrangement comprises a distributed winding, and
   the second coil arrangement comprises a distributed winding.

5. The stator according to claim 1, wherein:

the first stator teeth and the first winding grooves form a first pattern on the first axial outer side, which is multiply rotationally symmetrical with respect to the rotation axis, and the second stator teeth and the second winding grooves form a second pattern on the second axial outer side which is multiply rotationally symmetrical with respect to the rotation axis.

6. The stator according to claim 1, wherein the stator core is a wound component.

7. The stator according to claim 1, wherein the stator core comprises a soft-magnetic powder composite material.

8. The stator according to claim 7, wherein the stator core comprises multiple segments.

9. An electric machine comprising the stator according to claim 1, wherein the stator is arranged axially between a first rotor and a second rotor.

10. A vehicle comprising the electric machine according to claim 9.

11. A stator of an electric machine having an axial flow design, the stator comprising:

a stator core;

a first region oriented towards a first axial outer side, and a second region oriented towards a second axial outer side;

first stator teeth and first winding grooves formed alternately in the first region in a circumferential direction on the first axial outer side;

second stator teeth and second winding grooves formed alternately in the second region in the circumferential direction on the second axial outer side;

the first stator teeth are aligned to be offset to the second stator teeth; and the first winding grooves are spaced apart from the second winding grooves on an outer radially circumferential surface in the circumferential direction;

wherein each of the first winding grooves are circumferentially aligned with a circumferential center of one of the second stator teeth in an axial direction, and each of the second winding grooves are circumferentially aligned with a circumferential center of one of the first stator teeth in the axial direction.

12. The stator according to claim 11, further comprising a first coil arrangement in the first region, the first coil arrangement is contained in sections in the first winding grooves; and a second coil arrangement in the second region, the second coil arrangement is contained in sections in the second winding grooves.

13. The stator according to claim 12, wherein:

the first coil arrangement comprises a distributed winding, and the second coil arrangement comprises a distributed winding.

14. The stator according to claim 11, wherein the first stator teeth and the first winding grooves form a first pattern on the first axial outer side, which is rotationally symmetrical with respect to a rotation axis, and the second stator teeth and the second winding grooves form a second pattern on the second axial outer side which is rotationally symmetrical with respect to the rotation axis.

15. The stator according to claim 11, wherein the stator core is a wound component.

16. The stator according to claim 11, wherein the stator core comprises a soft-magnetic powder composite material.

17. The stator according to claim 16, wherein the stator core comprises multiple segments.

18. An electric machine comprising the stator according to claim 11, wherein the stator is arranged axially between a first rotor and a second rotor.

19. The stator according to claim 11, wherein the first winding grooves are spaced apart from the second winding grooves on an outer radially circumferential surface in the circumferential direction such that there is no axial overlap between the first winding grooves and the second winding grooves on the outer radially circumferential surface.

* * * * *